Patented Jan. 16, 1923.

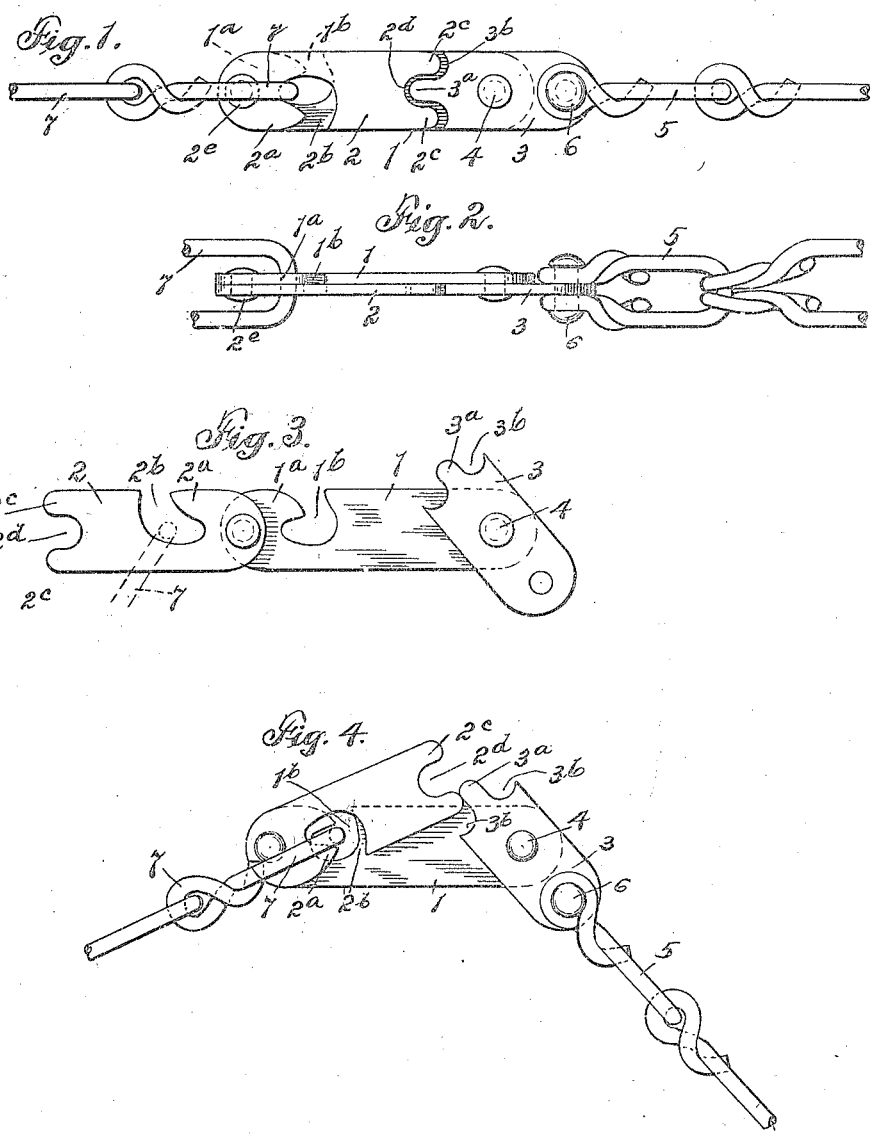

1,442,043

UNITED STATES PATENT OFFICE.

ARCHIBALD A. BOSSERMAN, OF GREENVILLE, VIRGINIA, ASSIGNOR TO THE CLEVELAND CHAIN & MANUFACTURING COMPANY, OF CLEVELAND, OHIO, A CORPORATION OF OHIO.

CHAIN-LINK CONNECTOR.

Application filed May 11, 1922. Serial No. 560,195.

*To all whom it may concern:*

Be it known that I, ARCHIBALD A. BOSSERMAN, a citizen of the United States, residing at Greenville, in the county of Augusta and State of Virginia, have invented certain new and useful Improvements in Chain-Link Connectors, of which the following is a specification.

My invention relates to improvements in chain link connectors, the present embodiment of the invention being particularly designed and adapted for use in connecting the ends of the side chains or members of ordinary "non-skid" chains commonly employed in connection with automobile tires.

The primary object of the invention is to provide a generally improved chain link connector of this class which will be exceedingly simple in construction, cheap of manufacture and efficient in use.

A further and very important object is the provision of a link connector which may be readily attached to the circumferentially extending chains or side members of non-skid chains and when so attached may be readily connected to the adjacent links of the side chains to draw the latter together in the act of securing the chain about the tire, suitable leverage being provided through the improved fulcrum lever pivotally mounted on the fulcrum or connector plate, the latter being provided with a suitable chain link receiving hook adapted to cooperate with the reversably arranged overlapping hook of the fulcrum lever whereby the latter is adapted to readliy transfer the connected link into the throat of the hook of the main or fulcrum connector link and the pivoted or fulcrum lever is securely locked in position.

A still further object is the provision of improved locking means for securing the parts in their chain connecting positions, the pivoted lever and locking members being so arranged and disposed relative to each other that the operation of connecting and disconnecting the adjacent side members of a nonskid chain may be quickly effected and in which the liability of the lever or other parts coming open or disarranged will be reduced to a minimum.

With the above mentioned and other ends in view, the invention consists in the novel construction, arrangement and combinations of parts, hereinafter described, illustrated in one of its embodiments in the accompanying drawings, and particularly pointed out in the appended claims.

Referring to the drawings, forming a part of this specification, Figure 1 is a side elevation of the improved chain link connector in its connected or operative position as applied to the adjacent links of an ordinary non-skid chain.

Fig. 2, a top or edge view of the same.

Fig. 3 a side elevation of the same, detached, the pivoted members being disconnected and the pivoted fulcrum lever being in its open or initial link receiving position preparatory to bringing the parts together in their closed connected or locked positions.

Fig. 4, a similar view showing the pivoted lever and lock members in their intermediate or initial locking and unlocking positions.

Similar numerals of reference designate like parts throughout all the figures of the drawings.

The improved connector comprises a main fulcrum or connector link 1, provided at one end with a chain link receiving hook 1$^a$, and, in the present instance, with a chain link receiving recess 1$^b$. The hook 1$^a$, is provided at one side with an overlapping reversibly extending similarly shaped or complementary hook 2$^a$, provided with a fulcrum lever 2, the lever 2, in the present instance, being provided with a link receiving recess 2$^b$, so that when the hooks 1$^a$ and 2$^a$ are closed they conjointly form an intervening chain link opening or recess, as shown most clearly in Fig. 1 of the drawings.

As a means of securing the free end of the fulcrum lever 2 in its closed or chain link connecting position, the outer or free end of the lever 2 is provided, in the present instance, with lug members 2$^c$, and an intervening recess 2$^d$, and as a means of locking and unlocking the fulcrum lever 2 in its respective closed and open positions, the fulcrum link 1 is provided at its opposite end with a pivoted lever locking member 3, one end of the lever or locking member 3 being provided with an opening connected to a cross stem or pivot 4, the latter, in the present instance, being secured to one of the links 5, of the chain to be connected. The pivoted locking member 3 is pivoted, in the present instance, at one side of the fulcrum or connector link 1 by means of a pivot element 6, and one end of the pivoted lever locking member is provided with a projection or lug 3ª, and opposite recess portions 3ᵇ, adapted to enter into the recess 2ᵈ and receive the lugs 2ᶜ, respectively, of the fulcrum lever when the latter is in locked position, as shown in Fig. 1.

The fulcrum connector link 1, and fulcrum lever 2 and lever locking member 3, are preferably in the specific form of relatively flat plates as shown, the hook 2ª of the fulcrum lever 2 being secured in overlapping reverse relation to the relatively fixed hook 1ª of the link 1 by means of a pivot or rivet member 2ᵉ, and it will be noted upon reference to Fig. 2 of the drawings that the pivoted members 2 and 3 are mounted in the same plane at one side of the connector link or plate 1.

When it is desired to connect or disconnect the parts, the members 2 and 3 may be moved to substantially the position shown in Fig. 4 of the drawings, or, if desired, the free end of the lever may be bent or sprung to one side out of registering engagement with the lug 3ª of the locking member 3 and then moved to its open position, as shown in Fig. 3 of the drawings, there being sufficient resiliency or flexibility in the hook shaped fulcrum lever 2 to permit of this movement.

When it is desired to connect certain links of a chain to each other, the fulcrum lever 2 may be moved to an open position and the unattached link 7 indicated by dotted lines in Fig. 3 may be initially seated in the recess 2ᵇ, after which the lever 2 may be moved towards its reversed position or locking position at one side of the connector link 1, such movement serving to draw the link 7 toward the link receiving recess 1ᵇ in the link 1, and as the lever 2 is closed will deposit such link in such recess 1ᵇ and over the relatively fixed hook 1ª, the parts 2 and 3 being held in alinement by the tension of the connected chain parts and being prevented from accidental disarrangement or disconnection by the interlocking relation of the complementary recesses and projections in the parts 2 and 3.

Having thus described one of the embodiments of my invention, without having attempted to set forth all the forms in which it may be made, or all the modes of its use, what I claim and desire to secure by Letters Patent is,—

1. In a chain connector, a fulcrum link provided with a chain link receiving hook and a complementary pivoted overlapping reversely arranged hook provided with a fulcrum lever, and a pivoted link on said fulcrum link having a projection interlocking with said fulcrum lever when the latter is closed.

2. In a link connector for chains, a fulcrum connector link provided with a link receiving hook, a complementary hook pivoted in a reversed direction and provided with a lever, and a lever locking member pivoted on said fulcrum connector link and secured to a link and provided with a projection adapted to engage and interlock with said pivoted lever when the latter is in its closed or reversed position.

3. In a chain connector, a fulcrum link provided at one end with a chain link receiving hook and a complementary pivoted overlapping hook provided with a fulcrum lever, and a pivoted link on the opposite end of said fulcrum link having projections adapted to interlock with said fulcrum lever when the latter is closed and to hold said fulcrum lever and pivoted locking link in alined locking relation to each other.

4. In a chain connector, a fulcrum link provided with a chain link receiving hook, a lever provided with a complementary overlapping hook pivoted on said fulcrum link, said hooks when closed forming an intervening chain link receiving and carrying pocket and said lever being provided with lug and recess portions, and a pivoted locking member on said fulcrum link provided with the link of a chain to be connected and having complementary projections and recesses to receive and interlock with said lug and recess portions of said lever to hold the latter in its closed position.

5. In a chain link connector, a fulcrum link provided with a chain link receiving hook, a fulcrum lever provided with a pivoted complementary hook extending in a reverse direction when open, said fulcrum lever being provided with projection and recess portions, and a second pivoted member on said fulcrum link connected to an adjacent link of the chain to be connected and having complementary projection and recess portions adapted to interlock with said projection and recess portions of said fulcrum lever and hold the latter and said second pivoted member in interlocking relation to each other.

6. In a chain connector, a fulcrum link provided at one end with a chain link receiving recess and a hook, a lever provided with a complementary recess and overlapping hook pivoted on said fulcrum link hook, said hooks when closed forming an intervening chain link holding pocket and said lever being provided at its free end with lug and recess portions, and a pivoted lever locking member on said fulcrum link provided at one end with the link of a chain to be connected and at the other with complementary projections and recesses to receive and interlock with said lever to hold the latter in its closed position.

7. In a chain link connector, a fulcrum link provided at one end with a chain link receiving hook, a fulcrum lever provided with a complementary hook pivoted on the latter and adapted to extend in a reverse direction when open, said lever being provided at its free end with lug and recess portions, and a second pivoted member on said fulcrum link connected to an adjacent link of the chain to be connected and having complementary lug and recess members adapted to interlock with said lug and recess portions of said fulcrum lever and hold the latter and said second member in alined interlocking relation to each other.

8. In a link connector for chains, a fulcrum link provided at one end with a relatively fixed link receiving hook, a complementary hook pivoted on said hook in a reversed direction and provided with a lever having recesses, and a fulcrum lever locking member pivoted at the opposite end of said fulcrum link, one end being secured to an adjacent link of the chain to be connected and the other being provided with projections adapted to enter into and interlock with the recesses of said pivoted fulcrum lever when the latter is in its closed or reversed position whereby said pivoted fulcrum lever and link connecting members are held in alinement and in interlocked relation with each other.

9. In a chain link connector, a fulcrum link plate provided at one end with a chain link receiving recess and a hook, a similarly shaped fulcrum plate provided with a complementary chain link receiving hook and recess adapted when extended to receive the link of a chain to be connected and provided with a link receiving lever whereby the link to be connected may be drawn by said lever and deposited in the chain link receiving recess and hook of said fulcrum link plate when the fulcrum lever is moved to a reversed position in alinement with said link plate, and a second plate pivoted on said fulcrum link plate and connected to an adjacent link of the chain to be connected, said second pivoted plate being provided with projections adapted to interlock with the free end of said lever when reversed to lock the latter and the connected links in position.

10. In a chain link connector, a fulcrum connector plate provided at one end with a chain link receiving recess and a hook, a similarly shaped plate provided with a complementary chain link receiving hook and recess adapted when extended to receive the link of a chain to be connected and provided with a link receiving lever having end projections whereby the link to be connected may be engaged and seated in said lever recess and drawn by said lever and deposited in the chain link receiving recess and hook of said fulcrum connector plate when the fulcrum lever is moved to a reversed position in alinement with said fulcrum connector plate, and a second plate pivoted on said fulcrum connector plate and connected to an adjacent link of the chain to be connected, said second pivoted plate being provided with projections adapted to interlock with said projections of said lever when reversed to lock the latter and the connected links in position.

In testimony whereof I have affixed my signature.

ARCHIBALD A. BOSSERMAN.